United States Patent

[11] 3,566,132

[72] Inventor Richard L. Walker
Peabody, Mass.

[21] Appl. No. 693,339
[22] Filed Dec. 26, 1967
[45] Patented Feb. 23, 1971
[73] Assignee General Electric Company

[54] BEGINNING-OF-TAPE AND END-OF-TAPE SENSOR
8 Claims, 7 Drawing Figs.

[52] U.S. Cl. .................. 250/214, 179/100.2, 226/45, 250/219, 307/311, 356/199, 356/212
[51] Int. Cl. .................. H01j 39/12
[50] Field of Search .................. 356/199, 212; 226/45; 250/214, 219 (L), 219 (I), 219 (ID), 219 (RG), 209, 214; 307/311; 179/100.2

[56] References Cited

UNITED STATES PATENTS

| | | | |
|---|---|---|---|
| 2,632,855 | 3/1953 | Bendz | 226/45X |
| 2,777,069 | 1/1957 | Saeman | 250/219RG |
| 2,961,548 | 11/1960 | Prell | 250/219RG |
| 3,178,995 | 4/1965 | Hartman | 250/214UX |
| 3,229,103 | 1/1966 | Rantsch et al. | 250/219ID |
| 3,251,048 | 5/1966 | Killen | 250/219ID |
| 3,394,262 | 7/1968 | Kintigh | 250/219ID |
| 3,430,106 | 2/1969 | McDowell | 250/214X |
| 3,444,384 | 5/1969 | Horeczky | 250/214X |

OTHER REFERENCES

Symbol' s Dictionary, " Electronics Buyer' s Guide," July 20, 1960 P. 42 and 44

EG&G, " Photodiode Application Notes," Nov. 1967, print pages 1, 2 and 3.

Symbol' s Dictionary, " Electronics Buyer' s Guide," July 20, 1960 p.42 and 44

EG&G, " Photodiode Application Notes," Nov. 1967, print pages 1,2 and 3.

*Primary Examiner*—James W. Lawrence
*Assistant Examiner*—C. M. Leedom
*Attorneys*—George V. Eltgroth, Frank L. Neuhauser, Oscar B. Wadell, Edward W. Hughes, George R. Powers and Joseph B. Forman

ABSTRACT: A beginning-of-tape and end-of-tape sensor provides one signal when a first reflective area near the beginning of a tape is reached and provides a different signal when a second reflective area near the end of a tape is reached.

INVENTOR.
RICHARD L. WALKER

BEGINNING-OF-TAPE AND END-OF-TAPE SENSOR

BACKGROUND OF THE INVENTION

This invention relates to sensing apparatus and more particularly to apparatus for sensing a beginning-of-tape condition and an end-of-tape condition in a magnetic tape handler.

In high-speed data processing systems, one commonly used data storage medium is an elongated tape of flexible plastic material employing a magnetic coating on one side thereof. Such a medium is commonly referred to as a magnetic tape and is used in tape handlers wherein tape from a supply reel is moved by a rotating capstan past a read-write head, to a takeup reel for storage. The tape handlers perform their operations in response to commands from a central processor of the data processing system and must be capable of moving the tape at a high rate of speed in both forward and reverse directions and must be capable of changing the direction of motion of the tape very rapidly Accordingly, the tape handler, in response to commands to read or write data on the tape, moves the tape at a high "regulated" speed in a forward direction past the read-write head. In response to certain other commands, the tape handler moves the tape at an equally fast regulated speed in a reverse direction past an erase head. Finally, in response to commands to rewind the tape to its beginning, the tape is rewound on its supply reel by moving the tape in the reverse direction at a "rewind" speed which is even higher than the regulated speed employed during writing, reading and erasing operations.

A tape handler of a data processing system, to be employed most effectively, should remain idle no longer than is necessary. For example, upon completion of a rewind operation, the tape should be started forward immediately in a read or write operation. A sensor arranged adjacent to the tape detects a metal marker affixed to the beginning of the tape as the tape rewinds and signals the tape handler that the rewind operation is completed so that the next operation may be initiated. A second sensor arranged adjacent to the tape detects a second metal marker affixed to the end of the tape as the tape unwinds and signals the tape handler that the supply reel is almost empty so that the operation will be stopped.

The metal markers are detected in some prior art sensors by employing a light source mounted to direct a beam of light toward the tape wear the capstan. A photocell is arranged so that a small portion of this light is reflected off the surface of the tape and into the photocell when there is no metal marker near the light source. When the metal marker is positioned near the light source, a much greater portion of the light from the source is reflected from the metal marker into the photocell thereby activating the photocell. The activated photocell produces a signal which warns the tape handler that an end of tape has been reached. Such a system has a disadvantage in that a shiny piece of tape may reflect enough light from the light source to the photocell to cause the photocell to produce a false indication of a metal marker near the light source.

The present invention alleviates the disadvantages of the prior art by employing a light source and two photocells. The photocells are positioned so that light from the source is reflected from one area of the tape to a first photocell and light is reflected from an adjacent area of the tape to a second photocell when no metal marker is positioned near the light source. When a metal marker is positioned near the light source, light from the source is reflected from the metal marker to the first photocell and light is reflected from the tape to the second photocell. Signals produced by the two photocells are compared and only the difference in the amplitude of the signals is used to provide a signal to the tape handler. A shiny piece of tape reflects substantially equal amounts of light to each of the photocells thereby causing each photocell to produce substantially the same amplitude of signal so that no signal is provided to the tape handler. When a metal marker is adjacent the source, the metal marker reflects more light than the tape so that one photocell produces a signal having a much greater amplitude than the other photocell. The difference in the amplitude of these signals provides a signal to the tape handler.

The photocells used in many prior art sensors develop a current which is proportional to the quantity of light falling on the cell if the voltage across the photocell is constant. Some prior art sensors employ these photocells in a circuit wherein the voltage across the photocell varies as the current varies. This variation in voltage causes a reduction in the variation in current and causes a reduction in the amplitude of the signal supplied to the tape handler. The present invention alleviates this disadvantage of the prior art circuits by providing a means for providing a constant voltage across the photocells.

It is therefore, an object of this invention to provide an improved beginning-of-tape and end-of-tape sensor for use in a tape handler.

Another object of this invention is to provide an improved beginning-of-tape and end-of-tape sensor which reduces the effects of varying amounts of reflection from different tapes.

Still another object of this invention is to provide an improved sensor which delivers a first signal when the beginning of tape is sensed and a different signal when the end of tape is sensed.

A further object of this invention is to provide an improved sensor which compares the quantity of light reflected from two different portions of a tape.

A still further object of this invention is to provide a photocell circuit having means for providing a constant voltage across each of the photocells.

SUMMARY OF THE INVENTION

The foregoing objects are achieved in the instant invention by providing a new and improved beginning-of-tape and end-of-tape sensor for use in a tape handler This sensor compares the quantity of light reflected from two different portions of a tape and provides a first signal when the reflective marker at the beginning of the tape is sensed by a first photocell and provides a second signal when a reflective spot near the end of the tape is sensed by a second photocell. The amplitude of these signals is increased by a novel circuit which provides a substantially constant voltage across each of the photocells.

Other objects and advantages of this invention will become apparent from the following description when taken in connection with the accompanying drawings.

DESCRIPTION OF THE PREFERRED EMBODIMENT

Figure 1:
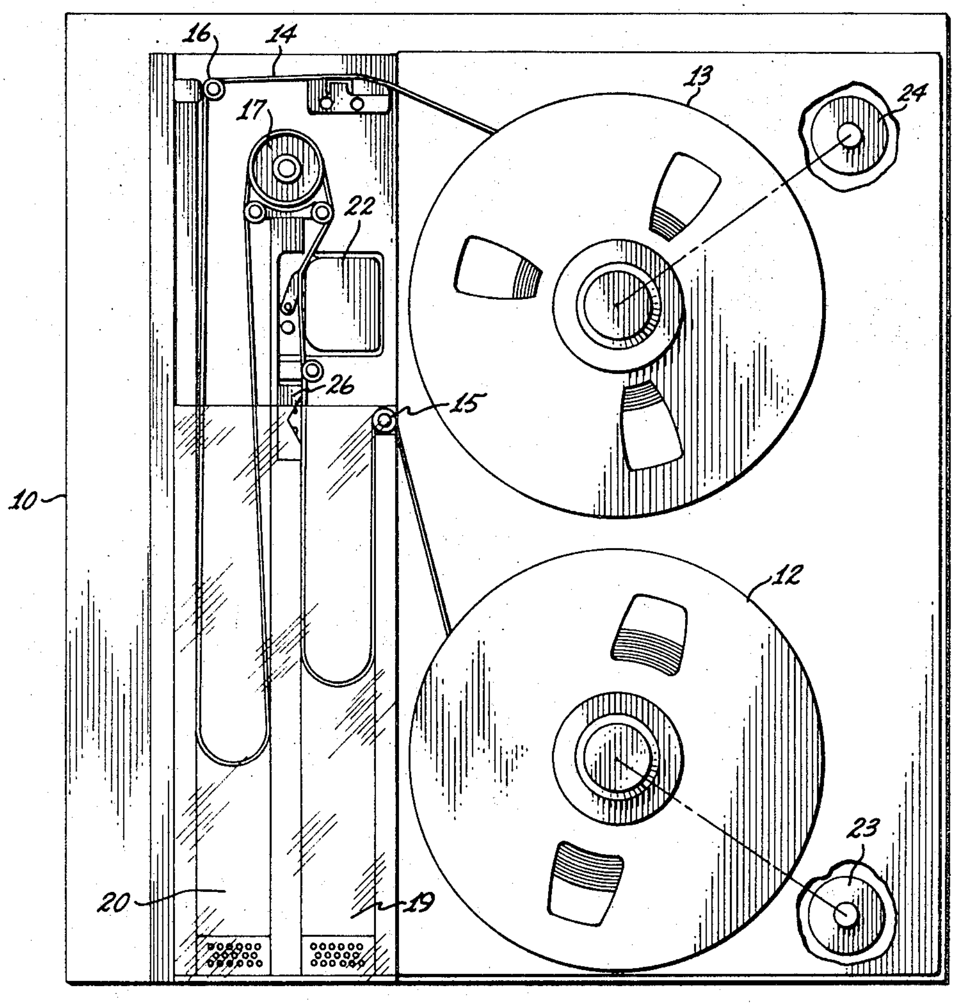
FIG. 1 is an elevation view of a tape handler embodying the instant invention.

With reference to the drawing, FIG. 1 illustrates an apparatus utilizing the beginning-of-tape and end-of-tape sensor of the present invention. The mechanical components of the apparatus are mounted upon a panel 10 and include a supply reel 12, takeup reel 13 and a quantity of a suitable data storage medium shown, for example, in the form of an elongated magnetic tape 14 of flexible plastic material employing a magnetic coating on one side thereof. Tape 14 passes from one reel to the other over a pair of rollers 15 and 16, and is driven by a capstan 17 which is connected to a suitable drive motor (not shown). The capstan which drives tape 14 in either a forward or a reverse direction is mounted between a pair of vacuum loop bins 19 and 20. Tape from the supply reel 12 passes over a roller 15, through vacuum bin 19, past a read-write head 22, over capstan 17, through vacuum bin 20, over a roller 16 to the takeup reel 13. Reels 12 and 13 are given rotary motion by a pair of drive motors 23 and 24 suitably connected thereto.

Each of the vacuum bins 19 and 20, positioned between capstan 17 and a different one of the reels 12 or 13, includes a vacuum source (not shown). The vacuum in the bins causes the tape to be drawn therein forming a loop in each bin of variable length. As well known in the art, the buffer vacuum bins buffer the shock of the tape particularly during fast starting, stopping and reversing movements of the tape. In this manner, segments of tape in the immediate vicinity of the read-write head 17 can be effectively isolated from the tape on supply reel 12 and takeup reel 13 thereby making it possible to rapidly accelerate and decelerate the tape by capstan 17 without initially moving the more massive reels 12 and 13. In such an operation, a portion of tape is maintained in each of the bins and this portion lengthens and shortens during supply and takeup operations and provides controlled slack to accommodate the differential accelerations of the tape.

It is the purpose of the above described apparatus to move the tape over the read-write head 22 in order that information may be written onto or read from tape 14. In order that this information transfer may be properly accomplished, the tape must pass over read-write head 22 at a uniform rate of speed regardless of the direction in which it is going. This rate of speed is relatively high and the direction of movement is often reversed quite rapidly so that information may be quickly transferred to or read from various portions of the tape. To achieve this transfer, capstan 17 is normally rotated at a regulated speed in either direction by a bidirectional motor (not shown). In order to prevent all of the tape from being removed from reels 12 and 13, a reflective marker is placed near each end of the tape 14 and a sensor is employed to detect the presence of the markers and to develop signals which prevent all of the tape from being removed from the reels. The sensor may comprise a source of light and a pair of photocells positioned in a mounting block 26.

Figure 2:
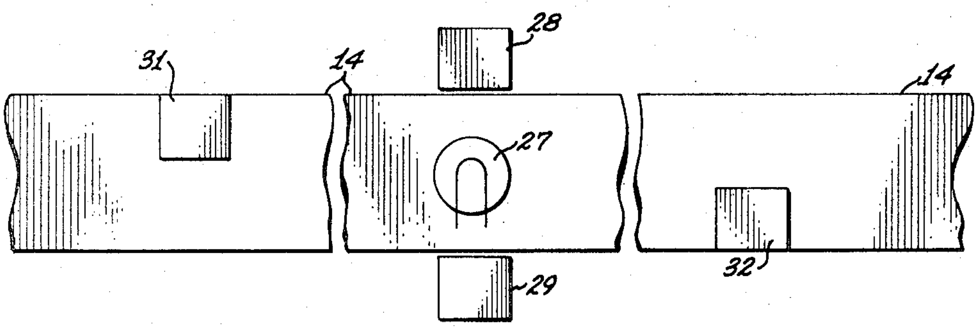
FIG. 2 is a portion of the view of FIG. 1 showing the relative positions of the tape and the photocells.
Figure 3:
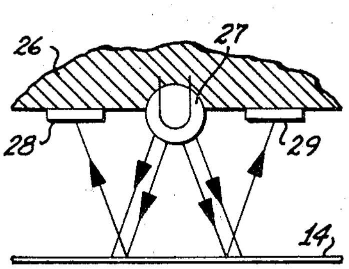
FIGS. 3, 4 and 5 show the operation of the light sensors.
Figure 4:
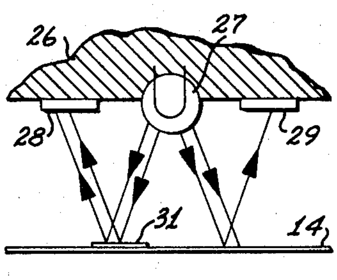
Figure 5:
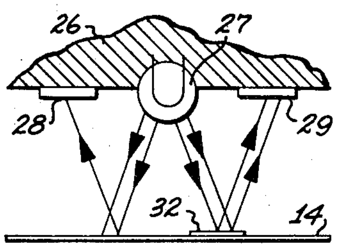

Referring again to the drawings, FIGS. 2, 3, 4 and 5 illustrate the relationship between the magnetic tape 14, the metal markers or reflective areas 31 and 32 and the radiation sensitive devices or photocells 28 and 29. As shown in FIG. 2, magnetic tape 14 has a first reflective area 31 near the beginning of the tape and a second reflective area 32 near the end of the tape. A source of light or radiation 27 is arranged so that light from the source 27 is reflected from tape 14 to photocells 28 and 29 as shown in FIG. 3. When there is no reflective area near source 27, substantially equal quantities of light are reflected from tape 14 to photocells 28 and 29. When the reflective area 31 at the beginning of the tape is positioned adjacent to source 27, an increased amount of light from the source 27 is reflected from area 31 to the photocell 28 as shown in FIG. 4. When the reflective area 32 near the end of the tape is positioned adjacent light source 27, an increased amount of light from source 27 is reflected from area 32 to the photocell 29 as shown in FIG. 5. When a substantially constant value of voltage having a value of zero is applied across photocells 28 and 29, each of these photocells develops a current which is directly proportional to the quantity of light falling on the photocell.

Figure 6:
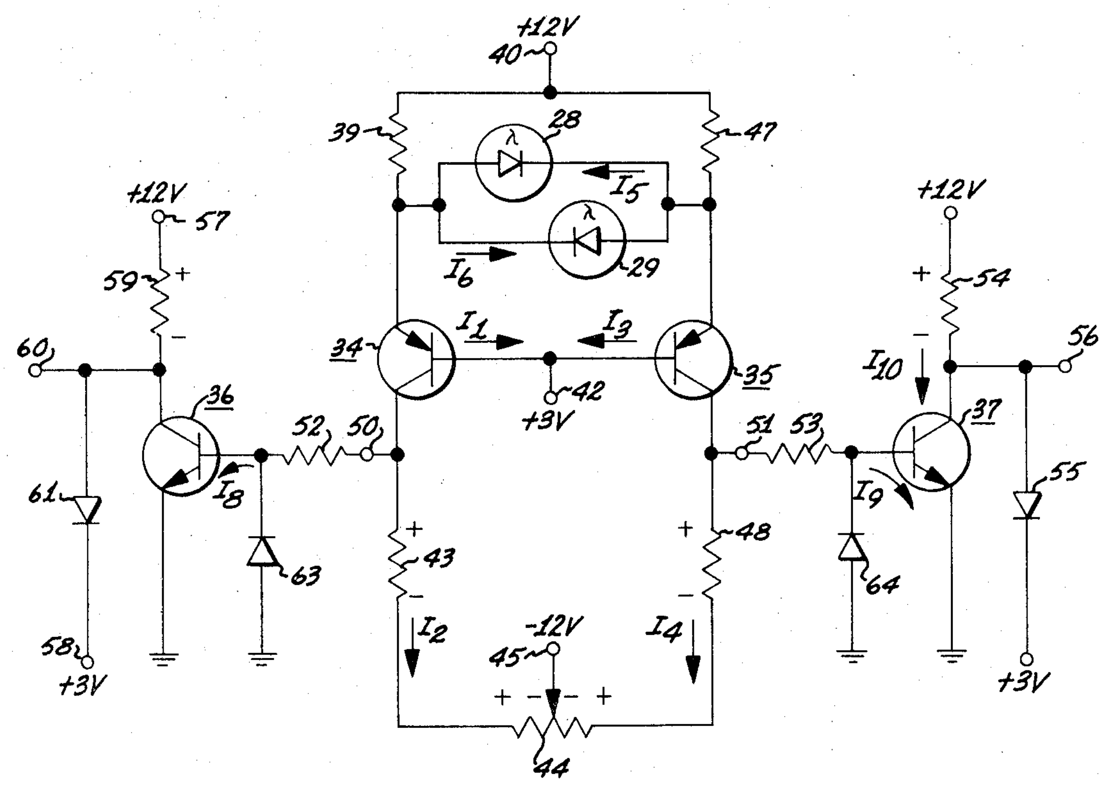
FIG. 6 is a schematic drawing of an embodiment of the circuit portion of the instant invention.

FIG. 6 discloses a circuit for sensing the beginning of tape and the end of tape comprising a pair of photocells 28 and 29 which are capable of developing an electric current. These cells include photovoltaic cells and photodiodes operating in a photovoltaic mode. The circuit also includes and a plurality of transistors 34—37 each having a control electrode or base, a first output electrode or emitter and a second output electrode or collector. The photocells 28 and 29 are each connected between the emitter of transistor 34 and the emitter of transistor 35. The emitter of transistor 34 is coupled through a resistor 39 to a terminal 40 which is connected to a first reference potential such as a + 12-volt source. The base of transistor 34 and the base of transistor 35 are each connected to a second reference potential such as a + 3-volt source connected to a terminal 42. When transistor 34 is rendered conductive, the voltage drop between the emitter and the base is substantially constant even when the value of current through the transistor changes. The voltage drop between the emitter and the base of transistor 35 is also substantially constant when transistor 35 is rendered conductive. Since the bases of transistor 34 and 35 are each connected to a second reference potential such as a + 3-volt source, the voltage at the emitters of transistors 34 and 35 is substantially constant. The voltage drop between the base and the emitter of transistor 34 is substantially equal to the voltage drop between the base and the emitter of transistor 35 so that the voltage across photocells 28 and 29 is substantially equal to zero.

The +12-volts at terminal 40 causes a current $I_1$ to flow from terminal 40 through resister 39, emitter and base of transistor 34 to terminal 42 thus rendering transistor 34 conductive. When transistor 34 is rendered conductive, a current $I_2$ flows from terminal 40 through resistor 39, through emitter to collector of transistor 34, through a resistor 43 and potentiometer 44, to a third reference potential such as a − 12-volt source connected to terminal 45. Current $I_2$ provides a voltage drop of the polarity shown across resistor 43 and potentiometer 44. The + 12volts at terminal 40 causes a current $I_3$ to flow through a resistor 47, from the emitter and base of transistor 35 to terminal 42. Current $I_3$ causes a larger current $I_4$ to flow from the terminal 40 through resistor 47, through emitter to collector of transistor 35, through a resistor 48 and potentiometer 44 to terminal 45. Current $I_4$ provides a voltage drop of the polarity shown across resistor 48 and potentiometer 44. Potentiometer 44 is adjusted so that the voltage drop across resistor 43 and the left portion of potentiometer 44 is substantially equal to the voltage drop across resistor 48 and the right portion of potentiometer 44 when substantially equal amounts of light fall on photocells 28 and 29. The equal voltage drops across resistors 43 and 48 cause the voltage at output terminal 50 to be substantially equal to the voltage at output terminal 51. The voltage drop of the polarity shown across resistor 43 and potentiometer 44 adds to the voltage at terminal 45 so that the voltage at terminal 50 has a positive value.

The positive voltage at terminal 50 causes a current $I_8$ to flow from terminal 50 through resistor 52, from the base to the emitter of transistor 36 to ground. Current $I_8$ renders transistor 36 conductive so that the voltage at the collector of transistor 36 and at signal output terminal 60 is substantially at ground potential. The voltage drop across resistor 48 and potentiometer 44 cause a positive voltage at terminal 51. The positive voltage at terminal 51 causes a current $I_9$ to flow through resistor 53, from the base to the emitter of transistor 37 to ground. Current $I_9$ renders transistor 37 conductive and causes the voltage at the collector of transitor 37 at signal output terminal 56 to be substantially at ground potential. Resistors 52 and 53 limit the amounts of currents $I_8$ and $I_9$ flowing in the base-emitter of transistors 36 and 35. Diodes 63 and 64 prevent a negative voltage at terminals 50 and 51 from causing damage to transistors 36 and 35.

When substantially equal amounts of light fall on photocells 28 and 29, the current $I_5$ developed by photocell 28 is equal to the current $I_6$ developed by photocell 29. Currents $I_5$ and $I_6$ flow in a path through photocells 28 and 29 and do not provide any current to transistors 34 and 35.

When the end of tape marker 32 shown in FIG. 5 is positioned adjacent light source 27, an increased amount of light is reflected from reflective area 32 to photocell 29 so that current $I_6$ has a greater value than current $I_5$. A portion of the current which flowed through resistor 39 and transistor 34 when currents $I_5$ and $I_6$ were equal, now flows through resistor 39, photocell 29 and transistor 35. This causes the current $I_2$ through transistor 34, resistor 43 and potentiometer 44 to be reduced so that the voltage drop across resistor 43 and potentiometer 44 is reduced. The voltage at output terminal 50 now has a negative value so that transistor 36 is rendered nonconductive. When resistor 36 is rendered nonconductive, the voltage at output terminal 60 is clamped at approximately a + 3 volts by a current flowing from terminal 57, through resistor 59 and diode 61 to terminal 58. Current through transistor 35 and through resistor 48 and potentiometer 44 provides a voltage drop across resistor 48 and potentiometer 44 so the voltage at terminal 51 is positive. Transistor 37 is conductive and the voltage at signal output terminal 56 is at ground potential. Thus, when the end of tape marker 32 is positioned adjacent the light source the voltage at signal output terminal 60 is + 3 volts and the voltage at signal output terminal 56 is at ground potential.

When the beginning of tape marker 31 shown in FIG. 4 is positioned adjacent light source 27, an increased amount of light is reflected from reflective area 31 to photocell 28 so that current $I_5$ has a greater value than current $I_6$. A portion of the current which flowed through resistor 47 and transistor 35 when ground $I_5$ and $I_6$ were equal, now flows through resistor 47, photocell 28 and transistor 34. This causes the current $I_4$ through transistor 35, resistor 48 and potentiometer 44 to be reduced so that the voltage drop across resistor 48 and potentiometer 44 is reduced. The voltage at output terminal 51 now has a negative value so that transistor 37 is rendered nonconductive. When transistor 37 is rendered nonconductive, the voltage at output terminal 56 is clamped at approximately a + 3 volts by a diode 55. Current through transistor 34 and through resistor 43 and potentiometer 44 provide a voltage drop across resistor 43 and potentiometer 44 so that the voltage at terminal 50 is positive. Transistor 36 is conductive and the voltage at signal output terminal 60 is at ground potential. Thus, when the beginning of tape marker 31 is positioned adjacent the light source 27 the voltage at signal output terminal 56 is a + 3 volts and the voltage at signal output terminal 60 is at ground potential.

Figure 7:
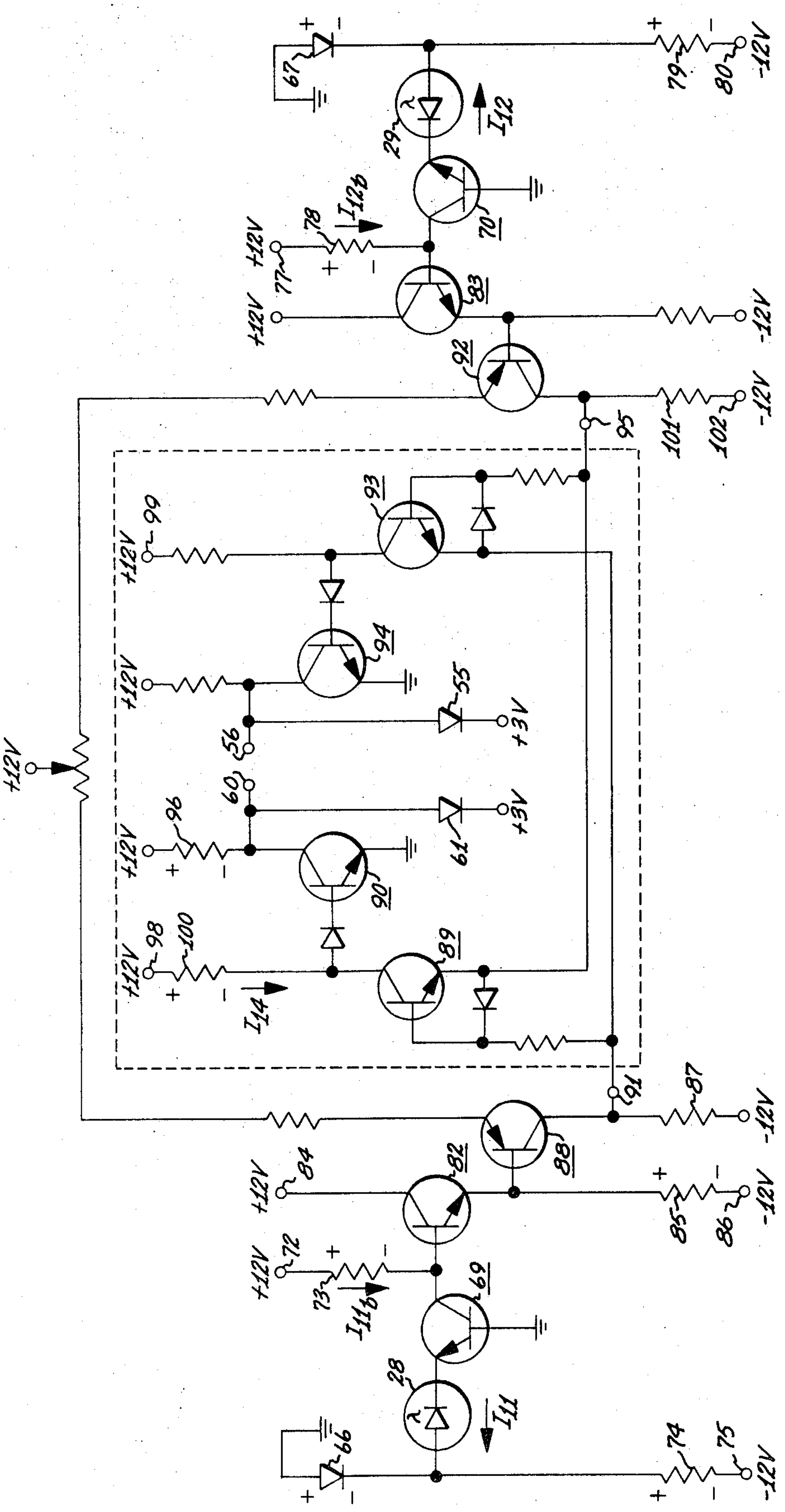
FIG. 7 is another embodiment of the circuit portion of the instant invention.

FIG. 7 illustrates another embodiment of the circuit shown in FIG. 6 wherein the voltage across photocells 28 and 29 is held at a substantially constant value of zero by a pair of diodes 66 and 67 and by a pair of transistors 69 and 70. The photocells 28 and 29 which can be used in the circuit of FIG. 7 include photoresistors and photoconductive cells, in addition to the photocells which were used in the circuit of FIG. 6. When transistor 69 or 70 is rendered conductive, the voltage drop between the base and the emitter is substantially constant even when the value of current through the transistor changes. When diodes 66 and 67 are rendered conductive, the voltage drop between the anode and the cathode of each of these diodes is substantially constant even when the value of current through the diode changes. These diodes and transistors provide a substantially constant value of voltage across each of the photocells 28 and 29 even though the current through the photocells varies over a wide range of values. The voltage drop between the anode and the cathode of each of the diodes 66 and 67 is substantially equal to the voltage drop between the base and the emitter of each of the transistors 69 and 70 so that the voltage across each photocell has a value of zero. For example, the voltage drop across diode 66 is approximately 0.6 volts of the polarity shown so that the cathode of photocell 28 is at a − 0.6-volt potential. The voltage drop between base and emitter of transistor 69 is also approximately 0.6 volts so that the voltage at the anode of photocell 28 is also − 0.6 volts.

When substantially equal quantities of light fall on photocells 28 and 29 equal values of current $I_{11}$ and $_{12}$ flow through photocells 28 and 29 respectively. A small value of current $I_{11a}$ flows from ground through base to emitter of transistor 69, through photocell 28 and resistor 74 to terminal 75. Current $I_{11a}$ renders transistor 69 conductive so that a larger value of current $I_{11b}$ flows from terminal 72, through resistor 73, from collector to emitter of transistor 69, through photocell 28 and resistor 74 to terminal 75. When light is reflected from the tape to photocell 28, the value of current $I_{11}$ is relatively small so that $I_{11b}$ produces a relatively small value of voltage drop across resistor 73. The relatively small voltage drop across resistor 73 subtracts from the voltage at terminal 72 to provide a relatively large positive voltage at the base of transistor 82 so that transistor 82 is rendered conductive. The voltage between base and emitter of transistor 82 is approximately 0.6 volts so that the voltage at the emitter of transistor 82 and at the base of transistor 88 has a relatively large positive value. The relatively large positive voltage at the base of transistor 88 causes a small value of current to flow through transistor 88 and provides a relatively low value of voltage at output terminal 91. When current $I_{12}$ through photocell 29 is equal to current $I_{11}$ through photocell 28, the voltage at output terminal 91 is equal to the voltage at output terminal 95. The voltage at the base is equal to the voltage at the emitter of transistor 89 and the same is true at transistor 93. Transistors 89 and 93 are each rendered nonconductive. The +12 volt potential at terminals 98 and 99 causes transistors 90 and 94 to be rendered conductive. When transistors 90 and 94 are conductive, the voltage at signal output terminals 56 and 60 is at approximately ground potential.

If a shiny spot on the tape causes an increase in light on both photocells 28 and 29, currents $I_{11}$ and $I_{12}$ both increase so that the voltage drop across resistors 73 and 78 increase. The increase in the voltage drop across resistors 73 and 78 causes a decrease in the voltage at the base of transistors 82 and 83 which in turn causes a decrease in the voltage at the emitters of transistors 82 and 83. This causes the voltage at the base of transistors 88 and 92 to become more negative so that transistors 88 and 92 are rendered more conductive. When the transistors 88 and 92 are rendered more conductive, the voltage at the output terminals 91 and 95 becomes more positive. This causes the voltage at the base and at the emitters of transistors 89 and 93 to be more positive so that the voltage at the base is substantially equal to the voltage at the emitter of transistors 89 and 93. Transistors 89 and 93 are rendered nonconductive. When transistors 89 and 93 are nonconductive, transistors 90 and 94 are both conductive so the voltage at output terminals 56 and 60 is still at substantially ground potential. Thus, an increase in light on both photocells 28 and 29 does not cause any change in the voltage at signal output terminals 56 and 60. resistor When a reflective spot causes an increase in light on only one of the photocells, a corresponding change in output voltage is produced at one of the signal output terminals 56 or 60. For example, when an increase in light falls on photocell 28, the value of the current $I_{11b}$ through reisitor 73 increases so that the voltage drop across resistor 73 increases. The increase in voltage drop across resistor 73 causes a decrease in the voltage at the base of transistor 82 which in turn causes an increase in the voltage between the collector and the emitter of transistor 82. This causes the voltage at the base of transistor 88 to become more negative so that transistor 88 is rendered more conductive. When transistor 88 is rendered more conductive, the voltage at the output terminal 91 and at the base of transistor 89 becomes more positive. The voltage at the emitter of transistor 89 does not change. The positive voltage at the base of transistor 89 renders transistor 89 conductive. when transistor 89 is rendered conductive, a current $I_{14}$ flows from terminal 98, through resistor 100, collector to emitter of transistor 89, and resistor 101 to terminal 102. Current $I_{14}$ produces a voltage drop of the polarity shown across resistor 100 thereby reducing the voltage at the collector of transistor 89. The reduction in the voltage at the collector of transistor 89 decreases the voltage at the base of transistor 90 which renders transistor 90 nonconductive. When transistor 90 is rendered nonconductive, the voltage at the output terminal 60 increases and is clamped at a value of approximately + 3.6 volts. The voltage at output terminal 56 remains at approximately ground potential.

Thus, the present invention discloses a novel end-of-tape and beginning-of-tape sensor which prevents tape having a shiny surface from producing false signals. The present invention has means for providing a constant value of zero voltage across the photocells so that a changing voltage does not produce false signals.

While the principles of the invention have now been made clear in an illustrative embodiment, there will be immediately obvious to those skilled in the art many modifications of structure, arrangement, proportions, the elements, materials, and components, used in the practice of the invention, and otherwise, which are particularly adapted for specific environments and operating requirements without departing from those principles. The appended claims are therefore intended to cover and embrace any such modifications, within the limits only of the true spirit and scope of the invention.

I claim:

1. A beginning-of-tape and end-of-tape sensor for use with a source of radiation and a tape having first and second reflective areas, said sensor comprising: first and second radiation responsive devices, each of said devices being positioned adjacent said source and adjacent said tape so that substantially equal quantities of radiation from said source are reflected from said tape to each of said devices in the absence of a reflective area near said source, said first device receiving a greater quantity of radiation when said first reflective area is adjacent said source, said second device receiving a greater quantity of radiation when said second reflective area is adjacent said source, each of said devices developing an electrical current which is determined by the quantity of radiation received by said device; and means for comparing the current developed by said first and said second devices and for providing a signal, the value of said signal being determined by the difference in current developed in said first and said second devices, said means being coupled to said first and said second devices.

2. A beginning-of-tape and end-of-tape sensor for use with a source of light and a tape having first and second reflective areas, said sensor comprising: first and second photocells, each of said cells being positioned adjacent said source and adjacent said tape so that substantially equal quantities of light from said source are reflected from said tape to each of said cells in the absence of a reflective area near said source, said first cell receiving a greater quantity of light when said first reflective area is adjacent said source, said second cell receiving a greater quantity of light when said second reflective area is adjacent said source, each of said cells developing an electrical current which is proportional to the quantity of light received by said cell; and means for comparing the current developed by said first and said second cells and for providing a signal, the value of said signal being determined by the difference in the current developed in said first and said second cell, said means being coupled to said first and said second cell, said means being coupled to said first and said second cells.

3. A beginning-of-tape and end-of-tape sensor for use with a source of light and a tape having a first reflective area near the beginning of the tape and a second reflective area near the end of the tape, said sensor comprising: first and second photocells, each of said cells being positioned adjacent said source and adjacent said tape and arranged so that substantially equal quantities of light from said source are reflected from said tape to each of said cells in the absence of a reflective area near said source, said first cell receiving a greater quantity of light when said first reflective area is adjacent said source, said second cell receiving a greater quantity of light when said second reflective area is adjacent said source, each of said cells developing a current which is determined by the quantity of light received by said cell; and circuit means for comparing the current developed by said first and said second cells, said circuit means being coupled to said first and said second cells, said circuit means developing a first signal when said first cell receives a greater quantity of light and said circuit means developing a second signal when said second cell receives a greater quantity of light.

4. A beginning-of-tape and end-of-tape sensor as defined in claim 3 wherein said circuit means comprises: first and second transistors each having a control electrode and first and second output electrodes; first, second and third reference potentials; first resistive means connected between said first potential and said first output electrode of said first transistor; second resistive means connected between said first potential and said first output electrode of said second transistor, said control electrodes of said first and said second transistors being connected to said second potential; third resistive means connected between said third potential and said second output electrode of said first transistor; fourth resistive means connected between said third third potential and said second output electrode of said second transistor; means for connecting said first and second cells between said first output electrode of said first transistor and said first output electrode of said first transistor and said first output electrode of said second transistor; and first and second output terminals, said first output terminal being connected to said second output electrode of said first transistor, said second output terminal being connected to said second output electrode of said second transistor.

5. A beginning-of-tape and end-of-tape as defined in claim 3 wherein said circuit means comprises: first, second, third and fourth transistors each having a base, a collector and an emitter; first, second, third and fourth reference potentials; first resistive means connected between said first potential and said emitter of said first transistor second resistive means connected between said first potential and said emitter of said second transistor, said base of said first and said second transistors each being connected to said second potential; third resistive means connected between said third potential and said collector of said first transistor; fourth resistive means connected between said third potential and said collector of said second transistor; means for connecting said first and second cells between said emitter of said first transistor and said emitter of said second transistor, said base of said third transistor being coupled to said collector of said first transistor; fifth resistive means connected between said first potential and said collector of said third transistor, said emitter of said third transistor being connected to said fourth potential, said base of said fourth transistor being coupled to said collector of said second transistor; sixth resistive means connected between said first potential and said collector of said fourth transistor, said emitter of said fourth transistor being connected to said fourth potential; and first and second signal output terminals, said first output terminal being connected to said collector of said third transistor, said second output terminal being connected to said collector of said fourth transistor.

6. A beginning-of-tape and end-of-tape sensor for use with a source of radiation and a tape having first and second reflective areas, said sensor comprising: first and second photocells each having an anode and a cathode; first, second, third and fourth transistors each having a base, a collector and an emitter; first, second, third and fourth reference potentials; first resistive means connected between said first potential and said emitter of said first transistor; second resistive means connected between said first potential and said emitter of said second transistor, said base of said first and said second transistors each being connected to said second potential; third resistive means connected between said third potential and said collector of said first transistor; fourth resistive means connected between said third potential and said collector of said second transistor; said anode of said first cell and said cathode of said second cell each being connected to said emitter of said first transistor, said cathode of said first cell and said cathode of said second cell each being connected to said emitter of said first transistor, said cathode of said first cell and said anode of said second cell each being connected to said emitter of said second transistor, said base of said third transistor being coupled to said collector of said first transistor; fifth resistive means connected between said first potential and said collector of said third transistor, said emitter of said third transistor being connected to said fourth potential, said base of said fourth transistor being coupled to said collector of said second transistor; sixth resistive means connected between said first potential and said collector of said fourth transistor, said emitter of said fourth transistor being connected to said fourth potential; and first and second signal output terminals, said first output terminal being connected to said collector of said third transistor, said second output terminal being connected to said collector of said fourth transistor.

7. A beginning-of-tape and end-of-tape sensor for use with a source of radiation and a tape having first and second reflective areas, said sensor comprising: first and second radiation responsive devices; means for providing a substantially constant voltage across each of said devices, each of said devices providing an electrical current which is determined by the quantity of radiation received by said device; first and second amplifiers, said first amplifier being coupled to said first device, said second amplifier being coupled to said second device; and a comparator circuit having first and second signal input terminals and a signal output terminal, said first input terminal of said comparator circuit being coupled to said first amplifier, said second input terminal of said comparator circuit being coupled to said second amplifier, said comparator circuit providing a signal to said output terminal, the value of said signal being determined by the difference in current provided by said first and said second devices.

8. A beginning-of-tape and end-of-tape sensor for use with a source of radiation and a tape having first and second reflective areas, said sensor comprising: first and second photocells, each of said cells being positioned adjacent said source and adjacent said tape so that substantially equal quantities of radiation from said source are reflected from said tape to each of said cells in the absence of a reflective area near said source, said first cell receiving a greater quantity of radiation when said first reflective area is adjacent said source, said second cell receiving a greater quantity of radiation when said second reflective area is adjacent said source; means for providing a substantially constant voltage across each of said cells, each of said cells developing an electrical current which is determined by the quantity of radiation received by said cell; first and second amplifiers, said first amplifier being coupled to said first cell, said second amplifier being coupled to said second cell; and a comparator circuit having first and second signal input terminals and first and second signal output terminals, said first input terminal of said comparator circuit being coupled to said first amplifier, said second input terminal of said comparator circuit being coupled to said second amplifier, said comparator circuit providing signals to said output terminals, the value of said signals being determined by the difference in current provided by said first and second cells.